(12) United States Patent
Hernandez

(10) Patent No.: US 11,654,445 B2
(45) Date of Patent: May 23, 2023

(54) AUTOMATICALLY ADJUSTABLE TOOL FOR HOLDING A SPRAY PAINTING INSTRUMENT FOR PAINTING AN INFERNAL SURFACE OF A PIPE

(71) Applicant: Tiberio Hernandez, Freer, TX (US)

(72) Inventor: Tiberio Hernandez, Freer, TX (US)

( * ) Notice: Subject to any disclaimer, the term of this patent is extended or adjusted under 35 U.S.C. 154(b) by 50 days.

(21) Appl. No.: 17/350,372

(22) Filed: Jun. 17, 2021

(65) Prior Publication Data

US 2021/0308700 A1    Oct. 7, 2021

Related U.S. Application Data

(62) Division of application No. 16/597,031, filed on Oct. 9, 2019, now Pat. No. 11,065,630.

(Continued)

(51) Int. Cl.
| | |
|---|---|
| *B05B 13/06* | (2006.01) |
| *B05B 7/00* | (2006.01) |
| *B05B 9/00* | (2006.01) |
| *B25J 11/00* | (2006.01) |
| *B05C 7/08* | (2006.01) |
| *B05D 7/22* | (2006.01) |
| *F16L 55/44* | (2006.01) |
| *F16L 101/16* | (2006.01) |
| *B25J 5/00* | (2006.01) |

(52) U.S. Cl.
CPC ............ *B05B 7/0093* (2013.01); *B05B 9/007* (2013.01); *B05B 13/06* (2013.01); *B05C 7/08* (2013.01); *B25J 11/0075* (2013.01); *B05B 13/0627* (2013.01); *B05D 7/225* (2013.01); *B25J 5/007* (2013.01); *F16L 55/44* (2013.01); *F16L 2101/16* (2013.01); *Y10S 118/10* (2013.01)

(58) Field of Classification Search
CPC . B05B 13/06; B05C 7/08; B05C 7/225; Y10S 118/10; B25J 5/007
See application file for complete search history.

(56) References Cited

U.S. PATENT DOCUMENTS

| | | |
|---|---|---|
| 4,036,173 A | 7/1977 | Nicklas |
| 4,335,677 A | 6/1982 | Nagata et al. |

(Continued)

*Primary Examiner* — Karl Kurple
(74) *Attorney, Agent, or Firm* — M. Susan Spiering; Ochoa & Associates, P.C.

(57) ABSTRACT

Disclosed herein is a tool for holding a spray painting instrument, such as a painting gun for painting an internal surface of a pipe. In particular, the inventive tool is ideal for painting the interior of curves and angles in a pipe and is capable of moving through and uniformly painting up to 90 degree angles of pipes or hollow tubes. The tool has a hollow central tube for carrying a spray-painting gun and at least two projections extending outwardly from an outer surface of the hollow tube. A retracting arm assembly is provided on each projection. Each retracting arm assembly includes first and second retracting arms and a corresponding force exertion mechanism. In operation, when the tool is inserted inside the pipe, each retracting arm touches the internal surface of the pipe due to an outward force exerted thereon. The tool is movable inside the pipe and adjusts automatically to different pipe diameters. The tool can be used manually or in an automated fashion to push and pull the paint gun and paint the interior of a pipe.

8 Claims, 4 Drawing Sheets

Related U.S. Application Data

(60) Provisional application No. 62/743,192, filed on Oct. 9, 2018.

(56) References Cited

U.S. PATENT DOCUMENTS

| | | | | |
|---|---|---|---|---|
| 4,537,136 | A * | 8/1985 | Douglas | F16L 55/34 104/138.2 |
| 4,891,115 | A | 1/1990 | Shishkin et al. | |
| 7,181,985 | B2 * | 2/2007 | MacMillan | F16L 55/30 73/865.8 |
| 8,402,911 | B1 * | 3/2013 | Weisenberg | B05B 13/041 118/306 |
| 9,927,060 | B2 * | 3/2018 | Moses | F16L 55/34 |
| 2006/0266134 | A1 * | 11/2006 | MacMillan | B08B 9/0433 73/865.8 |
| 2008/0094428 | A1 * | 4/2008 | Otis | B41J 2/17553 347/1 |
| 2008/0098834 | A1 * | 5/2008 | Sergoyan | F16L 55/32 73/866.5 |
| 2012/0177809 | A1 * | 7/2012 | Solie | B05B 12/126 427/8 |
| 2022/0082198 | A1 * | 3/2022 | AlShammari | G01M 3/005 |
| 2022/0099230 | A1 * | 3/2022 | Badger | G01M 3/243 |
| 2022/0291170 | A1 * | 9/2022 | Russell | F16L 55/46 |

\* cited by examiner

AUTOMATICALLY ADJUSTABLE TOOL FOR HOLDING A SPRAY PAINTING INSTRUMENT FOR PAINTING AN INFERNAL SURFACE OF A PIPE

CLAIM FOR PRIORITY

This is a divisional application of Non-Provisional U.S. patent application Ser. No. 16/597,031 filed Oct. 9, 2019, which was based on U.S. Provisional Patent Application Ser. No. 62/743,192, filed on Oct. 9, 2018. The priorities of the foregoing applications are hereby claimed and their disclosures incorporated herein by reference.

FIELD OF THE INVENTION

The present invention relates generally to internal coating of pipes and tubes, and more particularly, to a tool used for holding a spray gun for coating internal surfaces of pipes and tubes.

BACKGROUND OF THE INVENTION

Internal coating or painting of pipes and tubes is essential in many industries, including oil & gas and marine industries. Various pipes are applied with internal coatings to protect them from the effects of corrosion and erosion caused by the fluids carried by the pipes. The internal coatings also reduce friction and turbulence between an internal surface of the pipe and the fluid flowing therein. This in turn increases the flow efficiency of the fluid. The coatings can be of epoxy, such as liquid epoxy and internal fusion bonded epoxy (FBE), paints, amine cured glass and ceramic coatings, such as the NOVA-Plate® 325 by the Sherwin Williams Company, and the like.

The internal surface of the pipes may suffer premature corrosion due to coating failures. A major cause of premature corrosion is the flaws in the finished coating, often referred to as porosity of the coating. A "holiday detection test" is used to detect the porosity (holes or discontinuity in the coating) that allows detection of flaws invisible to the naked eye. Holiday detection techniques such as JEEP, porosity detection, pinhole testers, and spark testers are well known in the art.

For internal coating of pipes having large diameters (for example, diameters greater than 12 inches), various tools are commercially available. These tools typically include a rotary paint spray gun that centrifugally dispenses the coating fluid on to the internal surface of the pipe. The rotary paint spray gun is often held in place by using a support and is maneuvered inside the pipe along its length either manually or by using an automated mechanism. For example, U.S. Pat. No. 4,036,173 issued to Nicklas, is directed towards a method and apparatus for sandblasting and coating interior surfaces of pipes. U.S. Pat. No. 4,335,677 issued to Nagata et al. is directed to a tool for coating the inner surfaces of tubes, and U.S. Pat. No. 4,891,115 issued to Shishkin et al. is directed to a cleaning tool for use on inner surfaces of pipelines. These tools are not shown to paint up to 90 degree angles within a pipe.

Manual maneuvering of the rotary paint spray guns is cumbersome, especially in cases when the pipes have long lengths. In addition, the quality of coatings thus applied suffers due to uneven and intermittent spraying of the coating material. One known solution to overcome this problem includes use of a tool to firmly hold and maneuver the rotary paint spray gun. For example, commercially available 'HDCBX-360-3 Paint Spray Coater™ by the Clemtex Company includes a centering carriage having a scissor like arrangement of arms. The arms are adjustable in their height by using a threaded screw arrangement. The centering carriage holds a centering sheave therein, which is used to hold a spinning head of a rotary paint spray gun at one end thereof. The hose of the rotary paint spray gun passes through the centering sheave. The hose is connected to a paint pump or pressure tank. The paint pump forces the coating fluid through the spray gun and the hose to the spinning head. The paint is slung by centrifugal force produced by the spinning head in a 360-degree pattern. The volume of paint directed to the spinning head can be adjusted by the pressure on the paint pump or by a pre-orifice used in a back-pressure orifice assembly. The wet film thickness of the paint is controlled by the speed with which the Spray Coater™ is moved through the pipe.

Another known solution is the Orbiter™ tool marketed by Clemco Industries. The Orbiter™ tool includes a control gun assembly that includes an adjustment lever and a pressure regulator for a centering carriage. A paint spray gun mounts on the control gun assembly. Centering carriages expand and collapse by use of an air cylinder. Manual adjustment of leg expansion is facilitated during operation to compensate for bends or protrusions in pipe. Scissor-type expansion legs are operated by an air cylinder and are regulated by the control gun assembly. Extension and retraction of the expansion legs is made possible due to the scissor type mechanism. A pressure regulator allows adjustment to the amount of air passing through the air cylinders. The pressure may be reduced to collapse the carriage appropriately when going around pipe angles. When the pressure is returned to its higher reading, the carriage expands to its full extension.

In addition, the "DP-IP01 Internal Pipe Painting Equipment™" by the DP Airless Company provides a threaded bolt-based height adjustment mechanism for three scissor arms. While the tool can be used for painting the interior of pipes having small diameters, it suffers from certain drawbacks as discussed below.

One of the major drawbacks associated with the tools descried herein is the need to adjust the distance between arms according to varying diameters of pipes. This adjustment requires manual efforts and undue experimentation by the technician operating the tools. Presently, the commercially available tools do not offer a suitable solution to overcome this drawback. In addition, since the distance between the arms (i.e., the height of the tool) is not automatically adjustable, it is difficult for the tool to maneuver around bends or angular parts of the pipes. For example, it becomes difficult for such tools to turn around an obtuse angle of a pipe. It becomes more difficult in cases of right angled bends in pipes. Moreover, the typical spray painting applications entail high operating pressures and the current tools fail in withstanding such high pressures without significant mechanical robustness, thereby increasing their costs of manufacturing. Finally, the bulky construction of the tools pose challenges when such tools are used in applications involving pipes of small diameters, for example, diameters less than about four (4") inches or six inches (6"). However, it should be noted that difficulties exist with current tools used to coat pipe interiors less than about ten inches (10").

In light of the foregoing, there exists a need for a reliable solution that overcomes one or more abovementioned problems of the existing solutions. The tool should eliminate the need for manual intervention in adjusting its height for varying tube diameters. In addition, the tool should work effectively with pipes having diameters between two (2) and ten (10) inches, and generally smaller than about 6-10". Finally, the tool should be simple in construction yet withstand high pressure painting operations.

SUMMARY OF THE INVENTION

Disclosed herein is a simple tool to hold a paint spray gun, capable of handling high pressure while in operation. The tool has retracting arms which roll within the confines of the (interior of the) pipe and can maneuver within curves and angles up to 90°. Embodiments of the invention provide a tool for holding a spray painting gun for coating an internal surface of a pipe and in particular, coating the interior of curves and 90° angles of pipes. A central hub includes a hollow tube for carrying the spray painting gun. At least two projections extend outwardly from an outer surface of the hollow tube. First and second retracting arms are provided for each projection. Each retracting arm includes a roller attached a first end thereof. Further, first and second pivot pins pivotably attach the first and second retracting arms, respectively, to each projection. A retraction mechanism is provided for each retracting arm and includes first and second fixed pins provided on each projection and first and second springs that connect second ends of the first and second retracting arms to the first and second fixed pins, respectively. The retraction mechanisms facilitate a pivotal movement of the first and second retracting arms about the first and second pivot pins, respectively. In operation, the tool is inserted inside the pipe such that each roller touches the internal surface of the pipe due to an outward force exerted by each retracting arm. The tool is movable inside the pipe and carries the spray painting gun inside the pipe for facilitating coating of the internal surface thereof. Moreover, the tool adjusts automatically to different pipe diameters due to its retracting arms.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements, and in which.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION OF EMBODIMENTS

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event, such a component is described, but not depicted in a drawing, the absence of such a drawing should not be considered as an omission of such design from the specification.

Before describing the present invention in detail, it should be observed that the present invention utilizes a combination of system components which constitutes a tool used for painting an internal surface of a tubular pipe. Accordingly, the components and the method steps have been represented, showing only specific details that are pertinent for an understanding of the present invention so as not to obscure the disclosure with details that will be readily apparent to those with ordinary skill in the art having the benefit of the description herein.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
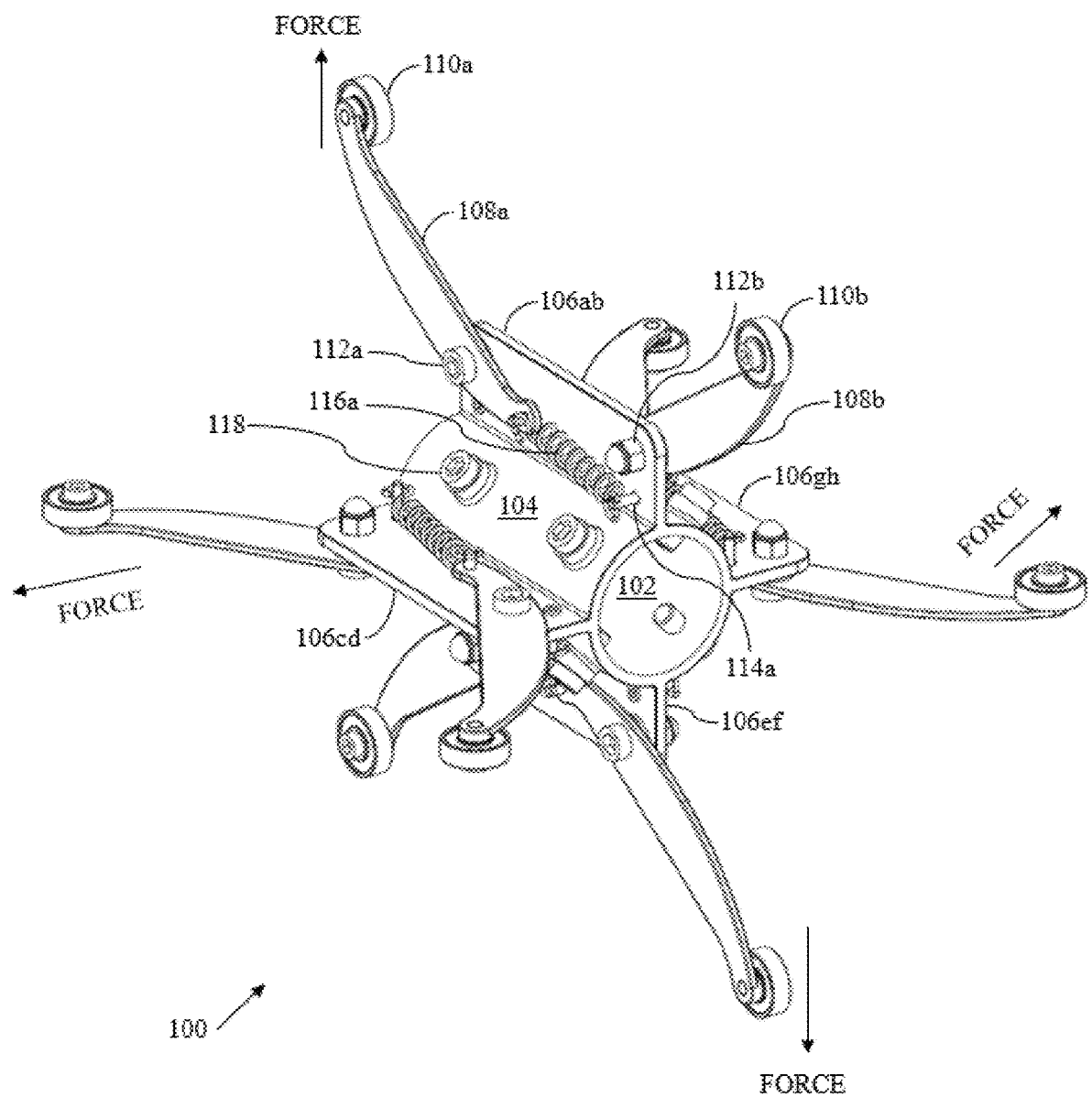
FIG. 1 is a perspective view of a tool used for coating an internal surface of a tubular pipe.

FIG. 1 illustrates a perspective view of a tool 100 used for coating an internal surface of a tubular pipe. The tool 100 includes a central hub 102. The central hub 102 includes a hollow tube 104 and first through fourth projections 106ab, 106cd, 106ef, and 106gh (collectively referred to as 'projections 106') that are formed on an outer surface of the hollow tube 104 and are preferably equally spaced apart with respect to an outer circumference of the hollow tube 104. In the exemplary scenario with four projections 106 illustrated here, the four projections 106 are preferably spaced apart from each other by 90-degrees. A first retracting arm 108a and a second retracting arm 108b are removably and pivotally attached to the first projection 106ab by means of a first pivot pin 112a and a second pivot pin 112b, respectively. The first and second retracting arms 108a and 108b are pivotable with respect to the pivot pins 112a and 112b respectively. A first roller 110a is attached at a first end of the first retracting arm 108a. Similarly, a second roller 110b is attached to a first end of the second retracting arm 108b. The rollers 110a and 110b may be ball bearings that are attached to the first and second retracting arms 108a and 108b by using respective pins and are freely movable with respect to the respective pins. Such attachments are well known in the art and their further description is avoided for the sake of brevity.

A second end of the first retracting arm 108a is attached to a first fixed pin 114a by using a first spring 116a, such as a helical compression spring. The first spring 116a pulls the second end of the first retracting arm 108a towards the first fixed pin 114a. Since the first retracting arm 108a is pivotably attached to the projection 106ab about the first pivot pin 112a, the force applied by the first spring 116a pulls the first roller 110a upwards, with respect to the central hub 102 (the direction of the force is shown with an arrow along with the first roller 110a). Similarly, a second end of the second retracting arm 108b is attached to a second fixed pin 114b (not visible in Figs) by using a second spring 116b (not visible in Figs). The second spring 116b pulls the second end of the second retracting arm 108b towards the second fixed pin 114b. Since the second retracting arm 108b is pivotably attached to the projection 106ab about the second pivot pin 112b, the force applied by the second spring 116b pulls the second roller 110b upwards, with respect to the central hub 102. Thus, the springs 116a and 116b help the retracting arms 108a and 108b remain in their "normal position" (i.e., pulled upwards with respect to the central hub 102). If a counter-force of a magnitude greater than that exerted by springs 116a and 116b is applied on the retracting arms 108a and 108b, they can be moved downwards with respect to the central hub 102.

The retracting arms 108a and 108b of the first projection 106ab and similar retracting arms of the projections 106cd, 106ef, and 106gh are collectively referred to as the retracting arms 108. Further, any other suitable mechanism such as a lever mechanism, spiral spring, elastic material, or a torsion spring mechanism may be used in place of the first and second springs 116.

The second projection 106cd, the third projection 106ef, and the fourth projection 106gh each have similar arrangements of two retracting arms, corresponding rollers, pivot pins, fixed pins, and springs attached thereto (not numbered in FIG. 1 for sake of simplicity). Since these arrangements are similar in construction and functioning to the arrangement of the first projection 106ab, the first and second retracting arms 108a and 108b, the first and second rollers 110a and 110b, the first and second pivot pins 112a and 112b, the first and second fixed pins 114a and 114b, and the first and second springs 116a and 116b, their description has been omitted so as not to obfuscate the present specification. Further, it should be noted that in FIG. 1, four projections 106ab, 106cd, 106ef, and 106gh are shown for illustrative purpose only. The invention is equally applicable to any number of projections, such as two or three projections. The projections should be preferably equally spaced apart from each other. For example, two projections may be spaced apart by 180-degrees and three projections may be spaced apart by 120-degrees. In an embodiment, the central hub 102 and the retracting arms 108 are made of aluminum, stainless (heavy stainless), or plastic (ABS). The central hub 102 and the retracting arms 108 can be manufactured by injection molding, cast, or welding. In an embodiment, size of the tool 100 may of various sizes fit for the interior of the pipe to be painted. The size of the tool may be from two (2") inches to ten (10") inches (measured with the legs outstretched) with a preference for size to fit a pipe interior of about five (5") oro six (6") inch diameter.

The central hub 102 preferably includes an appropriate arrangement to carry a spray painting gun (not shown). For example, one or more bolts or screws 118 may be provided on the central hub 102 to firmly hold the spray painting gun in the hollow tube 104 of the central hub 102. The operation of the tool 100 along with the system for painting (including the spray painting gun) is explained in detail in conjunction with FIG. 5 in the forthcoming description.

Figure 2:
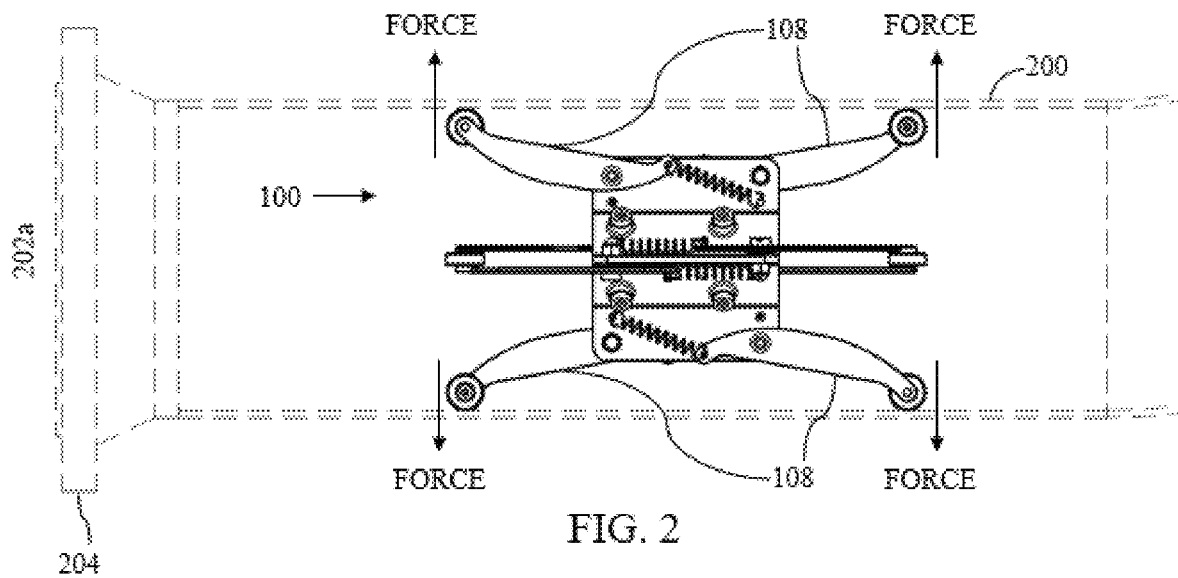
FIG. 2 is a front view illustrating the tool of FIG. 1 when inserted inside a straight section of the tubular pipe.
Figure 3:
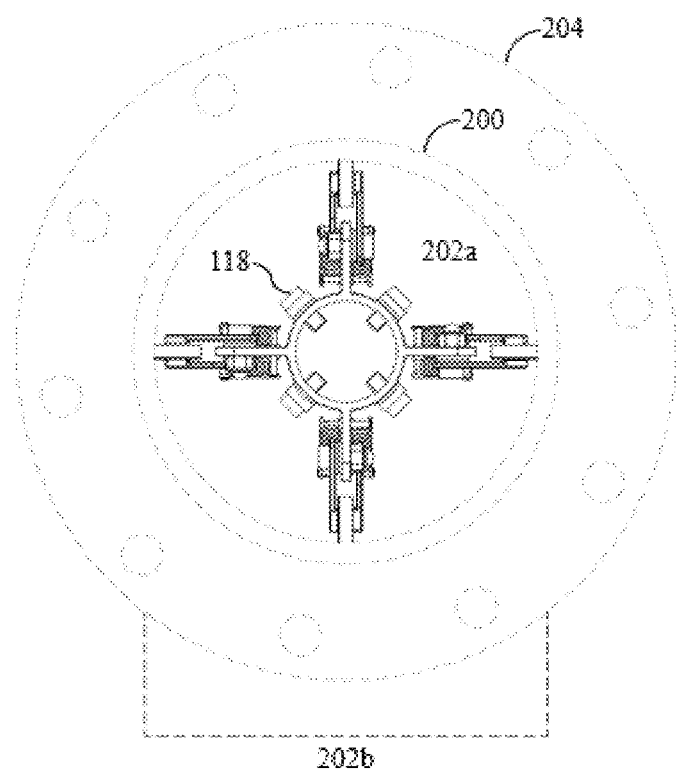
FIG. 3 is a side view corresponding to the front view of FIG. 2.

Referring now to FIG. 2, a front view illustrating the tool of FIG. 1, when inserted inside a tubular pipe in a straight section 200 of the tubular pipe, is shown. FIG. 3 is a side view corresponding to the front view of FIG. 2. Collectively referring to FIGS. 2 and 3, the tool 100 is inserted in a straight section 200 of a tubular pipe through its first end 202a. A flange 204, which is optional, is shown to be attached at the first end 202a. In the normal position of the tool 100, the retracting arms 108 are retracted such that the distance between the two retracting arms 108 (also referred to as the height of the tool 100) is maximum. When the diameter of the opening at the first end 202a is less than the height of the tool 100, the retracting arms 108 may be pushed towards the central hub 102, thereby reducing the height of the tool 100 for inserting the tool 100 through the opening at the first end 202a. Once inserted, the force on the retracting arms 108 acts as indicated by the arrows of FIG. 2. Thus, the rollers 110 firmly grip an inner surface of the tubular pipe. Due to the rolling function of the rollers 110, the tool can be moved along the straight section 200 of the tubular pipe. As shown in FIG. 3, the bolts (or screws) 118 assist in holding a spray painting gun (now shown) in the hollow portion formed by the hollow tube 104. This is further explained in conjunction with FIG. 5.

Figure 4:
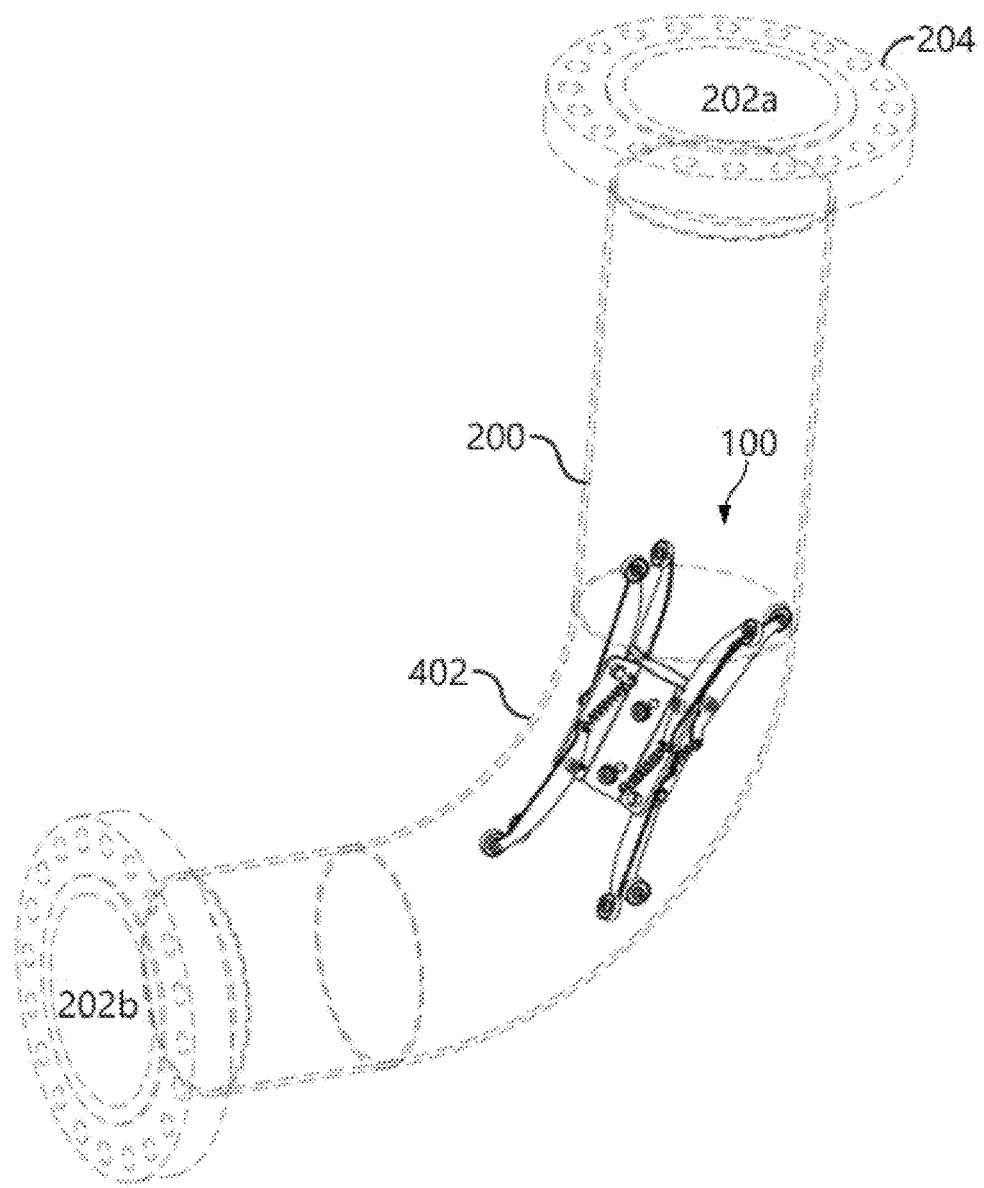
FIG. 4 is a perspective view of the tool of FIG. 1, when inserted inside a curved section of the tubular pipe.

FIG. 4 is a perspective view of the tool 100 of FIGS. 1-3, inserted inside the tubular pipe in a curved section 402 of the tubular pipe, in accordance with an embodiment of the present invention. As the tool 100 is moved inside the tubular pipe manually or by using an automated mechanism from the straight section 200 towards the curved section 402, the diameter of the tubular pipe changes. Since the retracting arms 108 have an outward force acting thereon, they expand or contract as required to accommodate the change in diameter of the tubular pipe as the tool traverses inside the tubular pipe. As there are multiple retracting arms 108 that are uniformly distributed along the hollow tube 104, the force is equally distributed. Thus, the tool 100 holds the internal surface of the tubular pipe firmly and can withstand high pressure applications of coating of the inside of the tubular pipe.

Figure 5:
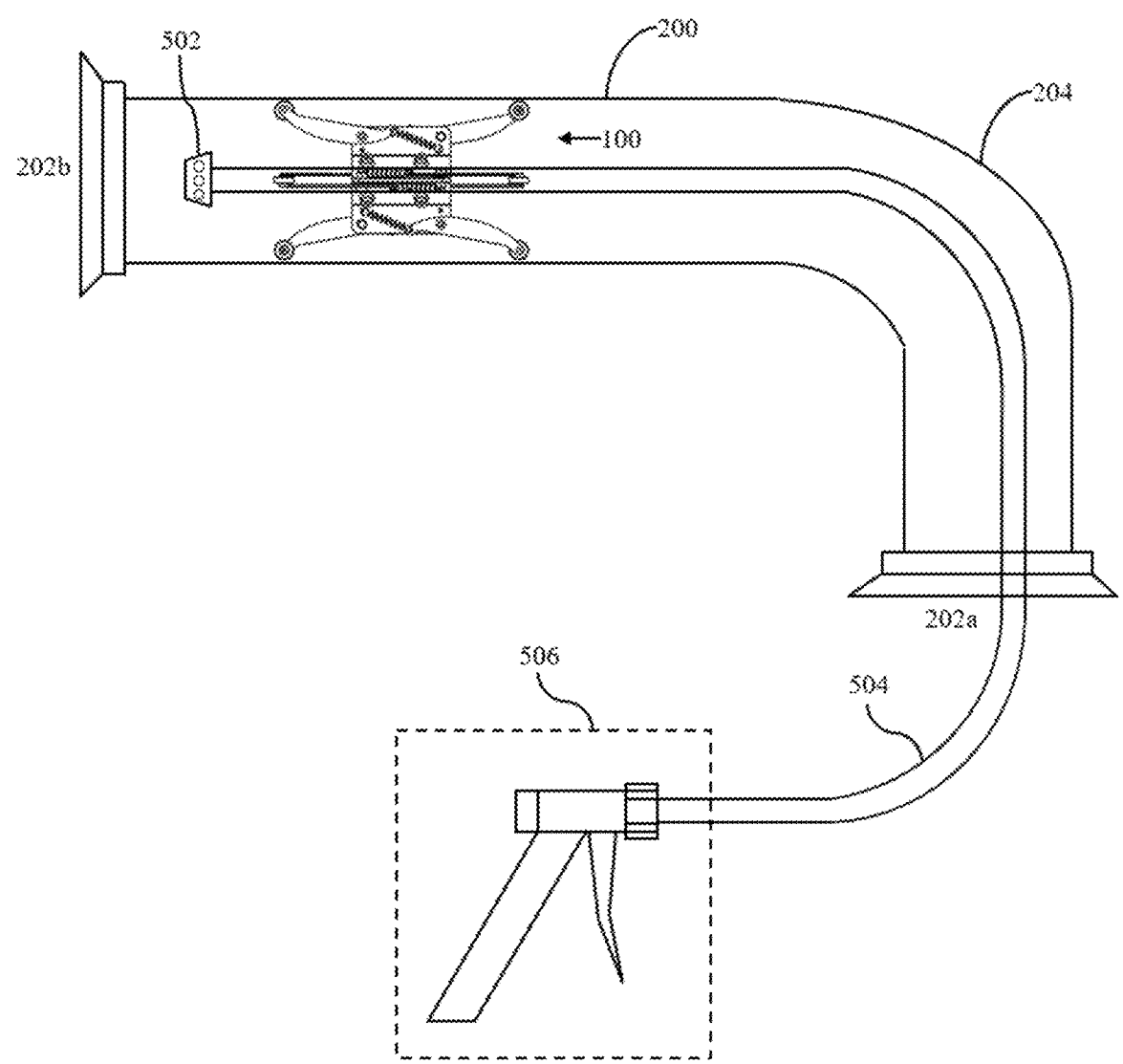
FIG. 5 is a schematic diagram showing the tool of FIG. 1 in operation, along with a system used for coating an internal surface of the tubular pipe.

Referring now to FIG. 5, a schematic diagram showing the tool 100 of FIG. 1 in operation, along with a system used for coating an internal surface of the tubular pipe, in accordance with various embodiments of the present invention is shown. The tool 100 is inserted in a hollow tubular pipe from its first end 202a. The tool 100 carries therein, a spray painting system having a spray nozzle 502 (sometimes referred to as air-gun nozzle), a paint hose or pipe 504, an air hose (not shown), and a fluid spraying mechanism 506. The fluid spraying mechanism 506 may be a spray painting gun such as a hand spray gun or a pump-based spraying system, depending on the application for which the tool 100 is being used. In an embodiment, the spray nozzle 502 may be driven by a motor. The air hose that is embedded in the hollow tube 104 is connected to the motor to provide the motor spin. Various media may be used to coat the internal surface of the tubular pipe. For example, the spraying medium may be made of epoxy, such as liquid epoxy or internal fusion bonded epoxy (FBE), paints, amine cured glass and ceramic coatings, such as the NOVA-Plate® 325 by the Sherwin Williams Company, and the like.

In operation, the paint hose 504 is inserted in a paint manifold. The air hose is inserted in the hollow tube 104 of the tool 100 to make the motor spin and is firmly fitted therein by using the bolts or screws 118. The spray nozzle 502 protrudes outside the tool 100. The tool 100 is inserted inside the tubular pipe by adjusting the height of the tool 100 as explained earlier. Once placed inside the tubular pipe, the tool 100 expands due to the retracting arms 108, thus adjusting to the diameter of the tubular pipe. The tool 100 is then maneuvered inside the tubular pipe by applying appropriate force on to the hose 504 in the direction of travel of the tool 100. As discussed in the foregoing, the tool 100 adjusts itself to the varying diameters of the tubular pipe along the curved section 402 and the straight section 200 by varying its height. The fluid spraying mechanism 506 injects compressed air through the air hose and coating fluid, such as an epoxy or a paint through the paint hose 504 to the spray nozzle 502. The spray nozzle 502 is a rotary nozzle that rotates at a very high speed (for example, at 20,000 revolutions per minute). The rotation of the spray nozzle 502 breaks up the coating fluid or atomizes it, causing the coating fluid to break up into droplets that form a spray. The spray nozzle 502 sprays the coating fluid on to the internal surface of the tubular pipe in a 360-degree pattern. When the tool is maneuvered from the first opening 202a to the second opening 202b with an appropriate linear velocity, the internal surface of the tubular pipe is uniformly coated. The tool 100 can securely hold the spraying nozzle 502, the air hose, and the paint hose 504 without vibrating the spraying nozzle 502 while the coating operation is in progress. The painting of the interior of the pipe can occur when the tool is inserted as well as removed from the pipe. Hence all surfaces are covered with paint. In an embodiment, the tool 100 can hold an airless pump for coating of the inner surface of the tubular pipe.

It should be noted that the coating system including the paint hose 504 and fluid spraying mechanism 506 are shown here for illustrative purposes only and they do not limit the scope of the invention in any way. The present invention is equally applicable to various other fluid spraying mechanisms known in the art. In addition, any other system that is used for internal coating of pipes may be supported by the tool 100 of the present invention. While the invention is described utilizing a round pipe having curves, it is understood by those of skill in the art that it may be employed for pipes of different shapes. The inventive tool can be used for shapes such as square tubing, octagon, or other shapes, provided the tool is secure within the interior and appropriate force is directed towards the interior surface of the pipe to securely roll (or maneuver) the tool during use. The tool may be used for other applications than painting the interior surface of a pipe, again, providing sufficient force against the interior surface wall to securely maneuver the tool during the application (other applications include for example: cleaning and pressure washing, or use with fluids for the interior of pipe or enclosed container).

The embodiments of the present invention, as described herein, offer one or more of the following advantages. The tool 100 can be efficiently used for applications involving coating interiors of smaller diameter tubular pipes, such as two inches (2") to ten inches (10") diameter tubular pipes. The same tool 100, depending on lengths of the retracting arms 108, may be used with tubular pipes of different diameters. Based on the experimental results obtained from the tests carried out by the inventors, the tool 100 works best with tubular pipes having diameters in the range of six inches (6") and eight inches (8"), with a spray gun that sprays the coating fluid at 2,000 to 4,500 psi (pounds per square inch). The tool 100 has the adjustable size feature through the pivotable arms, and can be used for tubular pipes of various dimensions, specifically two (2"), four inches (4") and up to ten inches (10") by either varying length of the retracting arms 108 or dimensions of the central hub 102. As an alternate embodiment, the tool can be manufactured to fit a specific interior pipe diameter, and corresponding paint spraying mechanism. For example, the tool may be made to fit the interior of a two (2") inch pipe such that the projections and arm assembly will maximize their extension to fit securely within the 2" inch diameter of the pipe. Unlike other tools on the market for cleaning or painting applications of this sort, the present tool is versatile in size either through specific manufacture, or adjustment through pivotable arms to fit smaller spaces and also travel through curves and up to 90 degree angles while still painting or cleaning the surface sufficiently to pass the holiday detection tests. The tool 100 is simple in construction and is less bulky as compared to the conventional tools. Further, the tool 100 adjusts its height automatically, thereby eliminating the need for a manual intervention. Since the linear velocity of the movement of the tool 100 inside the tubular pipe can be controlled (manually or automatically), and since the tool 100 can withstand high pressure coating operations, a uniform and flawless coating can be obtained. The coating thus produced is free from the holiday effect often observed in prior art. All standard precautions when using a high pressure spray painting apparatus should be employed with the present invention.

The present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention, and as defined by the following claim.

While pins, spring, and pivots were described for use with the present tool, alternatives exist allowing the projections and arm assemblies to pivot and expand to the interior of the pipe surface. It is understood any type of means is acceptable for the function of pivotal projection and arm assemblies provided the projection/arms expand within the pipe surface and secure sufficiently to be maneuvered through the interior of the pipe while the desired application is ongoing.

The invention claimed is:

1. A tool for holding a spray painting instrument for painting an internal surface of a pipe, the tool comprising:
   a central hub, wherein the central hub comprises a hollow tube for carrying the spray painting instrument and at least two projections that extend outwardly from an outer surface of the hollow tube; and
   a first retracting arm assembly and a second retracting arm assembly, provided on each of the at least two projections, wherein the first retracting arm assembly and includes:
   a first retracting arm pivotally attached to a first projection, of the at least two projections, with a first pivot pin and a first spring, wherein said first spring extends between a second end of the first retracting arm to a first fixed pin on the first projection, wherein the first pivot pin is placed in between a first end of the first retracting arm and the second end of the first retracting arm, and a second retracting arm pivotally attached to the first projection of the at least two projections with a second pivot pin and a second spring, wherein said second spring extends between a second end of the second retracting arm to a second fixed pin on the first projection, wherein the second pivot pin is placed in between a first end of the second retracting arm and the second end of the second retracting arm, and wherein the second retracting arm assembly includes:

a third retracting arm pivotally attached to a second projection, of the at least two projections, with a third pivot pin and a third spring, wherein said third spring extends between a second end of the third retracting arm to a third fixed pin on the second projection, wherein the third pivot pin is placed in between a first end of the third retracting arm and the second end of the third retracting arm, and a fourth retracting arm pivotally attached to the second projection of the at least two projections with a fourth pivot pin and a fourth spring, wherein said fourth spring extends between a second end of the fourth retracting arm to a fourth fixed pin on the second projection, wherein the fourth pivot pin is placed in between a first end of the fourth retracting arm and the second end of the fourth retracting arm, and in operation, when the tool is inserted inside the pipe, each of the first retracting arm, the second retracting arm, the third retracting arm, and the fourth retracting arm touches the internal surface of the pipe due to an outward force exerted thereon, and wherein the tool is movable inside the pipe and the tool engages curves of the pipe wherein said curves have angles of up to 90 degrees.

2. The tool according to claim 1 wherein the tool adjusts automatically to different pipe diameters.

3. The tool according to claim 1 wherein the tool has a width ranging from two (2") inches to ten (10") inches.

4. The tool according to claim 3 wherein the tool has a width from four (4") to eight (8") inches.

5. The tool according to claim 1 wherein each of the first retracting arm assembly and the second retracting arm assembly comprises wheels mounted on the first end of each of the first retracting arm and the second retracting arm.

6. The tool according to claim 1 wherein the tool further comprises the spray painting instrument having a spray nozzle, a paint hose, and an air hose secured in the central hub for uniformly painting the internal surface of the pipe.

7. The tool according to claim 1, wherein the central hub comprises at least three projections that extend outwardly from an outer surface of the hollow tube and are equally spaced apart from each other with respect to an outer circumference of the hollow tube.

8. The tool according to claim 1, wherein the central hub comprises four projections that extend outwardly from an outer surface of the hollow tube and are spaced apart from each apart by 90-degrees.

* * * * *